United States Patent
Klesmith et al.

(10) Patent No.: US 12,039,009 B2
(45) Date of Patent: Jul. 16, 2024

(54) GENERATION OF SYNTHETIC IMAGES OF ABNORMALITIES FOR TRAINING A MACHINE LEARNING ALGORITHM

(71) Applicant: THE BOEING COMPANY, Chicago, IL (US)

(72) Inventors: Zoe A. Klesmith, Atlanta, GA (US); Alexander S. Burch, Ballwin, MO (US)

(73) Assignee: THE BOEING COMPANY, Arlington, VA (US)

( * ) Notice: Subject to any disclaimer, the term of this patent is extended or adjusted under 35 U.S.C. 154(b) by 425 days.

(21) Appl. No.: 17/394,863

(22) Filed: Aug. 5, 2021

(65) Prior Publication Data
US 2023/0045344 A1   Feb. 9, 2023

(51) Int. Cl.
*G06V 10/00*   (2022.01)
*G06F 18/214*   (2023.01)
*G06N 20/00*   (2019.01)
*G06T 11/00*   (2006.01)

(52) U.S. Cl.
CPC ......... *G06F 18/2148* (2023.01); *G06N 20/00* (2019.01); *G06T 11/00* (2013.01)

(58) Field of Classification Search
CPC .......... G06N 3/08; G06N 3/082; G06N 3/084; G06N 3/086; G06N 3/088; G06N 3/0895; G06N 3/091; G06N 20/00; G06F 18/2148; G06F 18/214; G06F 18/2433; G06T 11/00; G06K 9/6257
See application file for complete search history.

(56) References Cited

U.S. PATENT DOCUMENTS

| 11,804,060 | B1* | 10/2023 | Zhao | G06F 18/2415 |
|---|---|---|---|---|
| 11,810,291 | B2* | 11/2023 | Liu | G06T 7/11 |
| 2016/0165148 | A1* | 6/2016 | Itoh | H04N 23/698 348/148 |
| 2018/0008141 | A1* | 1/2018 | Krueger | A61B 5/7257 |
| 2020/0349743 | A1* | 11/2020 | Kitamura | H04N 7/181 |
| 2021/0090715 | A1* | 3/2021 | Feldman | G10L 15/26 |

(Continued)

OTHER PUBLICATIONS

Ishi et al., JP,2012194108, Oct. 11, 2012.*

(Continued)

*Primary Examiner* — Amir Alavi
(74) *Attorney, Agent, or Firm* — ALSTON & BIRD LLP (57) ABSTRACT

A computing device, method and computer program product are provided to generate synthetic images of abnormalities on the surface of an object, such as a vehicle. The synthetic images of abnormalities on the surface of an object may be utilized for training a machine learning algorithm to detect and/or classify abnormalities. In the context of a method, a respective abnormality is parametrically modeled by selecting one or more control points that satisfy parameters associated with the respective abnormality and generating a surface representative of the respective abnormality based on the one or more control points. The method also renders a synthetic image of at least a portion of the surface of the object having the respective abnormality as defined by the parametric modeling thereof. The rendering of the synthetic image includes rendering the synthetic image in accordance with a predefined lighting condition and from a predefined viewpoint.

20 Claims, 5 Drawing Sheets

(56) References Cited

U.S. PATENT DOCUMENTS

| | | | |
|---|---|---|---|
| 2021/0358115 A1* | 11/2021 | Hever | G06T 7/0008 |
| 2022/0308147 A1* | 9/2022 | Chen | G06V 10/82 |
| 2023/0045344 A1* | 2/2023 | Klesmith | G06F 18/2148 |
| 2023/0076868 A1* | 3/2023 | Olender | G06T 5/005 |
| 2023/0316593 A1* | 10/2023 | Kumar | G06T 7/60 |
| | | | 706/12 |

OTHER PUBLICATIONS

Wang et al., CN108717262A, "Irregular curved surface tracking method and system based on matrix feature learning neural network". May 14, 2018.*

* cited by examiner

GENERATION OF SYNTHETIC IMAGES OF ABNORMALITIES FOR TRAINING A MACHINE LEARNING ALGORITHM

TECHNOLOGICAL FIELD

An example embodiment relates generally to a computing device, method and computer program product configured to generate synthetic images of abnormalities on a surface of an object and, more particularly, to a computing device, method and computer program product configured to generate synthetic images of abnormalities on the surface of an object based on the selection of one or more control points in order to train a machine learning algorithm to detect such abnormalities.

BACKGROUND

The surface of an object, such as a vehicle, may sometimes exhibit various abnormalities. These abnormalities may include dents, scratches, corrosion or the like. In order to determine if any action is to be taken relative to the abnormalities on the surface of an object, such as to improve the appearance of a vehicle and/or to maintain or improve the performance characteristics of a vehicle, the object may be inspected and any abnormalities on the surface of the object that are detected during the inspection may be flagged for further consideration. In some instances, abnormalities that are detected may be classified based upon the type of abnormality and/or the action to be taken relative to the abnormality.

With respect to vehicles, the inspections to detect abnormalities have generally been manually conducted. In this regard, a technician or other inspector surveys the exterior surface of the vehicle and detects and makes a record of any abnormalities that were detected. However, manual inspections of the surface of a vehicle are time consuming, and, in some instances, may produce inconsistent results depending upon, for example, differences between inspectors in terms of the rigor of the inspections and the subjectivity associated with the detection and classification of an abnormality. Some abnormalities may be located in places along the surface of the vehicle that are difficult for a technician to reach, thereby potentially increasing the time required for and the cost of an inspection.

Automated inspection techniques have been introduced in which images of the surface of a vehicle are captured and then evaluated in an effort to detect abnormalities on the surface of the vehicle. At least some of these automated inspection techniques incorporate artificial intelligence, such as a machine learning algorithm that is trained to review an image of the surface of a vehicle and to detect and, in some instances, classify an abnormality on the surface of the vehicle. In order to consistently detect abnormalities on the surface of a vehicle and, in some instances, to properly classify the abnormalities that are detected, a machine learning algorithm must be trained with many images of the surface of the vehicle. At least some of the images are of a surface of a vehicle that has no abnormalities, while other images of the surface of the vehicle have various types of abnormalities, such as abnormalities located in different locations upon the surface and/or abnormalities that are of different types or would otherwise be classified in a different manner.

For some vehicles, such as aircraft, the number of images of surfaces of aircraft having abnormalities has been relatively limited. As a result, the training of machine learning algorithms to detect abnormalities on the surface of aircraft has not been as fulsome as desired, thereby limiting the automated inspection of the surface of aircraft in instances in which the automation inspection techniques rely upon a machine learning algorithm since the machine learning algorithm that is trained with a more limited set of images may not consistently detect abnormalities and/or may not properly classify the abnormalities that are detected.

The limitations on the number of images of the surfaces of aircraft that have abnormalities may be attributable to various causes. For example, images of the surface of an aircraft may be captured by a drone that flies over the aircraft while the aircraft is parked on the ground, such as at an airport. However, it may be difficult to obtain proper authorization to pilot the drone over the aircraft while parked at an airport due to the various restrictions on the airspace surrounding an airport. Additionally, for aircraft operated by a commercial airline or by other public or private flight services, the operator of the aircraft may be reluctant to authorize the capture of images of an aircraft that is in operation in instances in which the surfaces of the aircraft have various abnormalities. Additionally, even if images of abnormalities on the surface of an aircraft are captured, the images may not be of sufficient quality to utilize for training a machine learning algorithm and, in any event, the manual capture of such images may be time-consuming.

BRIEF SUMMARY

A computing device, method and computer program product are provided in accordance with an example embodiment in order to generate synthetic images of abnormalities on the surface of an object, such as a vehicle, e.g., an aircraft. The synthetic images of abnormalities on the surface of an object that are generated may be utilized for training a machine learning algorithm. By generating a plurality of synthetic images of various types of abnormalities on the surface of an object under a variety of different conditions, such as different lighting conditions and from different viewpoints, a substantial number of synthetic images may be generated, thereby allowing a machine learning algorithm to be more fully trained based upon the synthetic images. As a result of the more extensive training, the resulting machine learning algorithm may more consistently and accurately detect abnormalities on the surface of the object and, in some embodiments, may more consistently and accurately classify abnormalities that are detected on the surface of an object, thereby improving automated techniques for inspecting the surface of an object and allowing through the surface of the object to be more efficiently inspected, such as relative to conventional manual inspection techniques.

In an example embodiment, a method is provided for generating synthetic images of abnormalities on a surface of an object for use in training a machine learning algorithm. For each of a plurality of abnormalities, the method includes parametrically modeling a respective abnormality by selecting one or more control points that satisfy parameters associated with the respective abnormality and generating a surface representative of the respective abnormality based on the one or more control points. The method also includes rendering a synthetic image of at least a portion of the surface of the object having the respective abnormality as defined by the parametric modeling thereof. The rendering of the synthetic image includes rendering the synthetic image in accordance with a predefined lighting condition and from a predefined viewpoint.

The method of an example embodiment also includes defining the number of the control points. In this regard, the parameters associated with the respective abnormality include the number of the control points. In another example embodiment, the method also includes defining one or more boundary control points along the boundary of the respective abnormality. In this regard, the parameters associated with the respective abnormality define the boundary. In this example embodiment in which the one or more control points include one or more interior control points, the method may also include defining the minimum spacing from the one or more interior control points that are selected to a respective boundary control point. The parameters associated with the respective abnormality may also include the minimum spacing. In another example, the method also includes defining a maximum distance that a control point is able to deviate in an orthogonal direction from the surface of the object. In this regard, the parameters associated with a respect of abnormality include the maximum distance.

A method of an example embodiment selects one or more control points by randomly selecting a plurality of control points that satisfy the parameters that are associated with the respective abnormality so as to define in array of control points. In an example embodiment, the method generates the surface representative of the respective abnormality by generating a b-spline surface. The method of an example embodiment renders a plurality of synthetic images of at least the portion of the surface of the object having the same respective abnormality in accordance with a plurality of different lighting conditions and from a plurality of different viewpoints.

In another example embodiment, a computing device is provided that is configured to generate synthetic images of abnormalities on the surface of an object for use in training a machine learning algorithm. The computing device includes processing circuitry and at least one non-transitory memory including computer program code instructions stored therein with the computer program code instructions being configured to, when executed by the processing circuitry, cause the computing device at least to parametrically model a respective abnormality by selecting one or more control points that satisfy parameters associated with the respective abnormality and generating a surface representative of the respective abnormality based on the one or more control points. Each of a plurality of abnormalities is parametrically modeled in this manner. The computer program code instructions are also configured to cause the computing device to render a synthetic image of at least a portion of the surface of the object having the respective abnormality as defined by the parametric modeling thereof. In this regard, the computer program code instructions are configured to cause the computing device to render the synthetic image by rendering the synthetic image in accordance with a predefined lighting condition from a predefined viewpoint.

The computer program code instructions are further configured to cause a computing device of an example embodiment to define the number of the control points. In this regard, the parameters associated with the respective abnormality include the number of the control points. In an example embodiment, the computer program code instructions are further configured to cause the computing device to define one or more boundary control points along the boundary of the respective abnormality. In this regard, the parameters associated with the respective abnormality define the boundary. The computer program code instructions may be further configured to cause the computing device of an example embodiment to define a maximum distance that a control point is able to deviate in an orthogonal direction from the surface of the object. In this regard, the parameters associated with the respective abnormality include the maximum distance.

The computer program code instructions of an example embodiment are configured to cause the computing device to select one or more control points by randomly selecting a plurality of control points that satisfy the parameters associated with the respective abnormality so as to define an array of control points. In an example embodiment, the computer program code instructions are configured to cause the computing device to generate the surface representative of the respective abnormality by generating a b-spline surface. The computer program code instructions may be configured to cause the computing device of an example embodiment to render the synthetic image by rendering a plurality of synthetic images of at least the portion of the surface of the object having the same respective abnormality in accordance with a plurality of different lighting conditions and from a plurality of different viewpoints.

In a further example embodiment, a computer program product is provided that is configured to generate synthetic images of abnormalities on a surface of an object for use in training a machine learning algorithm. The computer program product includes at least one non-transitory computer-readable storage medium having computer-executable program code instructions stored therein with the computer-executable program code instructions including program code instructions configured to parametrically model a respective abnormality by selecting one or more control points that satisfy parameters associated with the respective abnormality and generating a surface representative of the respective abnormality based on the one or more control points. Each of a plurality of abnormalities is parametrically modeled in this manner. The computer-executable program code instructions also include program code instructions configured to render a synthetic image of at least a portion of the surface of the object having the respective abnormality as defined by the parametric modeling thereof. In this regard, the program code instructions configured to render the synthetic image include program code instructions configured to render the synthetic image in accordance with a predefined lighting condition and from a predefined viewpoint.

The computer-executable program code instructions of an example embodiment also include program code instructions configured to define the number of the control points. In this regard, the parameters associated with the respective abnormality include the number of the control points. In another example embodiment, the computer-executable program code instructions also include program code instructions configured to define one or more boundary control points along a boundary of the respective abnormality. In this regard, the parameters associated with the respective abnormality define the boundary. In this example embodiment in which the one or more control points include one or more interior control points, the computer-executable program code instructions may also include program code instructions configured to define a minimum spacing from the one or more interior control points that are selected to a respective boundary control point. In this regard, the parameters associated with the respective abnormality include the minimum spacing. In another example embodiment, the computer-executable program code instructions also include program code instructions configured to define a maximum distance that a control point is able to deviate in an orthogonal direction from the surface of the object. In this regard, the parameters associated with the respective abnormality include the maximum distance.

The program code instruction configured to select one or more control points include, in an example embodiment, program code instructions configured to randomly select a plurality of control points that satisfy the parameters associated with the respective abnormality as to define an array of control points. In an example embodiment, the program code instructions configured to generate the surface representative of the respective abnormality include program code instructions configured to generate a b-spline surface. In another example embodiment, the program code instructions configured to render the synthetic image include program code instructions configured to render a plurality of synthetic images of at least the portion of the surface of the object having the same respective abnormality in accordance with a plurality of different lighting conditions and from a plurality of different viewpoints.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

A method, computing device and computer program product are provided to generate synthetic images of abnormalities on the surface of an object. The synthetic images may then be utilized in order to train a machine learning algorithm. Once trained, the machine learning algorithm is capable of consistently and accurately detecting and/or classifying abnormalities on the surface of an object, such as based upon an analysis of one or more images captured of the surface of the object. As a result, the surface of an object may be inspected in an automated manner utilizing the machine learning algorithm, thereby resulting in an efficient inspection process that accurately detects and/or classifies abnormalities on the surface of the object.

The method, computing device and computer program product may be configured to generate synthetic images of abnormalities on the surface of a variety of different types of object. As described herein by way of example, but not of limitation, synthetic images may be generated of abnormalities on the surface of a vehicle, such as an aircraft. However, synthetic images may be generated of abnormalities on the surface of other types of vehicles, such as automobiles, ships or other marine vehicles, spacecraft or the like, as well as other types of objects, such as roofs, bridges or other structures, satellite dishes or other types of antennas and the like. Nevertheless, the method, computing device and computer program product of an example embodiment will be hereinafter described by way of example, but not of limitation, with respect to a vehicle, such as an aircraft.

Additionally, the method, computing device and computer program product may be configured to generate synthetic images of a wide variety of different types of abnormalities on the surface of an object, regardless of the type of object. By way of example, but not of limitation, the abnormalities for which synthetic images may be generated include dents, scratches, corrosion, etc. In this regard, the method, computing device and computer program product of an example embodiment will be described hereinafter in conjunction with the generation of synthetic images of a dent on the surface of an aircraft, although such an abnormality on such a vehicle is provided by way of example and not of limitation.

Figure 1:
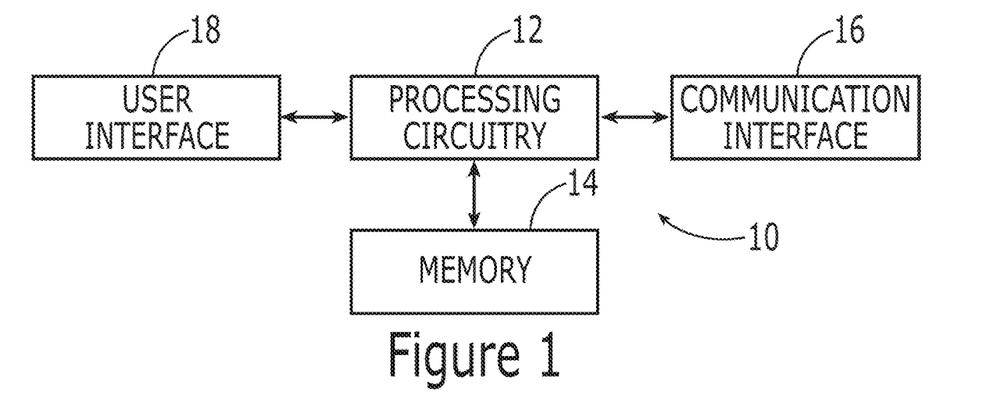
FIG. 1 is a block diagram of a computing device that may be specifically configured in accordance with an example embodiment in order to generate synthetic images of abnormalities on the surface of an object for use in training a machine learning algorithm in accordance with an example embodiment of the present disclosure.

A computing device that is configured to generate synthetic images of abnormalities on the surface of an object, such as a vehicle, may be embodied by a wide variety of different types of computing devices, such as a server, a computer workstation, a network of distributed computing devices, a personal computer, a tablet computer, etc. Thus, a specific hardware design is not required, but any of a variety of computing devices may be configured to operate as described herein. Regardless of the type of computing device that is configured to generate the synthetic images of abnormalities on the surface of an object, the computing device 10 as shown in FIG. 1 includes processing circuitry 12 and at least one non-transitory memory 14. Optionally, the computing device may also include a communication interface 16 and/or a user interface 18.

In some embodiments, the processing circuitry 12 (and/or co-processors or any other processors assisting or otherwise associated with the processing circuitry) can be in communication with the memory device 14 via a bus for passing information among components of the computing device 10.

The memory device can be non-transitory and can include, for example, one or more volatile and/or non-volatile memories. In other words, for example, the memory device may be an electronic storage device (for example, a computer readable storage medium) comprising gates configured to store data (for example, bits) that can be retrievable by a machine (for example, a computing device like the processing circuitry). The memory device can be configured to store information, data, content, applications, instructions, or the like for enabling the computing device to carry out various functions in accordance with an example embodiment of the present disclosure. For example, the memory device can be configured to buffer input data for processing by the processing circuitry. Additionally or alternatively, the memory device can be configured to store instructions for execution by the processing circuitry.

The processing circuitry 12 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 12 can be configured to execute instructions stored in the memory device 14 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The computing device 10 of an example embodiment can also include the communication interface 16. The communication interface can be any means such as a device or circuitry embodied in either hardware or a combination of hardware and software that is configured to receive and/or transmit data from/to other electronic devices in communication with the computing device. The communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

The computing device 10 may also optionally include a user interface 18 that may, in turn, be in communication with the processing circuitry 12 to provide output to the user and, in some embodiments, to receive an indication of a user input. The user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry embodied by the processing circuitry may be configured to control one or more functions of one or more user interface elements through computer program instructions (for example, software and/or firmware) stored on a memory accessible to the processing circuitry (for example, memory device 14, and/or the like).

Figure 2:
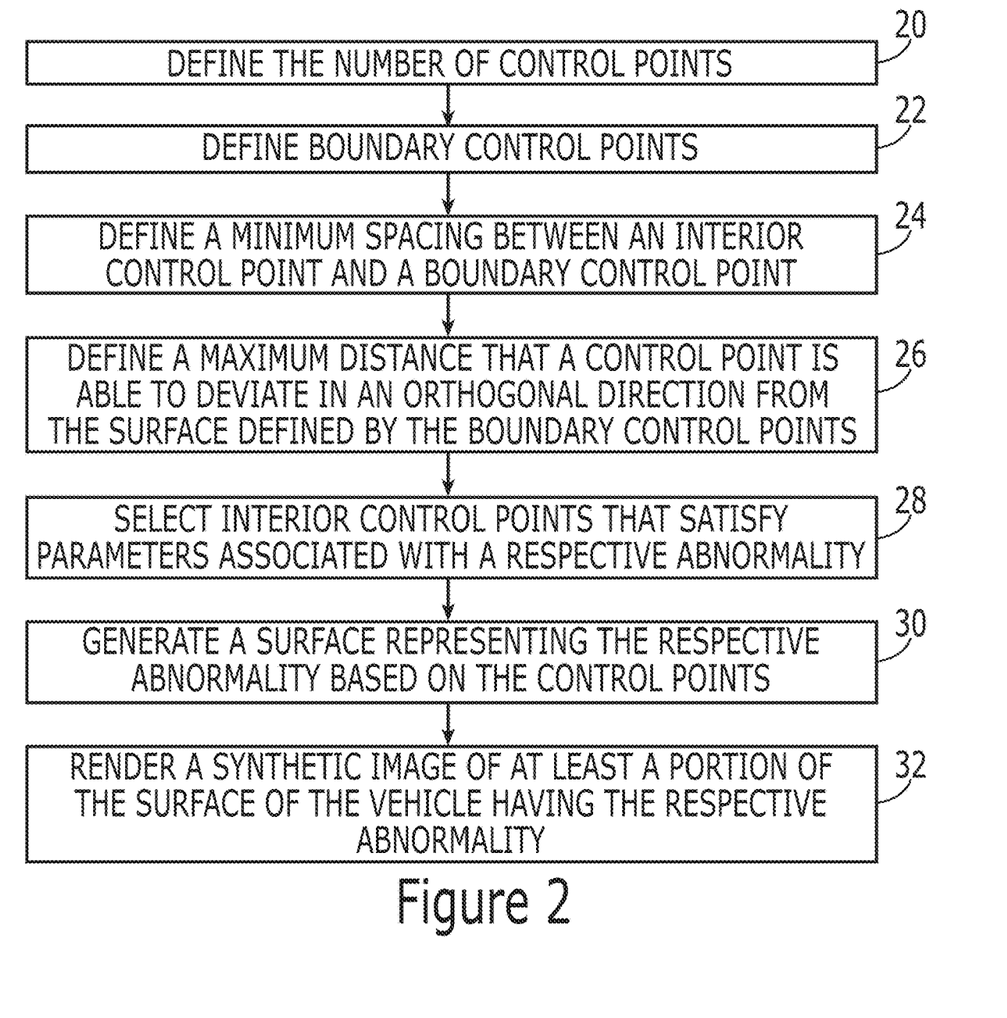
FIG. 2 is a flow chart illustrating the operations performed, such as by the computing device of FIG. 1, in order to generate synthetic images of abnormalities on a surface of an object in use for training a machine learning algorithm in accordance with an example embodiment of the present disclosure.

Referring now to FIG. 2, a flowchart illustrating the operations performed, such as by the computing device 10 of FIG. 1, in accordance with an example embodiment are depicted. The computing device, such as the processing circuitry 12, is configured to parametrically model a respective abnormality with the parametric modeling being repeated for each of a plurality of abnormalities. In order to parametrically model a respective abnormality, the computing device, such as the processing circuitry, is configured to select one or more control points that satisfy parameters associated with the respective abnormality and to thereafter generate a surface representative of the respective abnormality based on the one or more control points that have been selected. See blocks 28 and 30 of FIG. 2.

A variety of different types of parameters that must be satisfied by the control points that are selected may be defined depending upon, for example, the type of abnormality that is being parametrically modeled. With respect to the parametric modeling of a dent, the parameters may include one or more of: the number of control points, the boundary of the abnormality along which one or more boundary control points will be defined, the minimum spacing between an interior control point and a respective boundary control point and a maximum distance that an interior control point is able to deviate in a orthogonal direction from a surface in which the boundary control points are defined, such as in an outward direction and/or an inward direction relative to the surface of the vehicle.

As shown in block 20 of FIG. 2, for example, the computing device 10, such as the processing circuitry 12, is configured in accordance with an example embodiment to define the number of the control points, such as based upon input that is provided by an operator via the user interface 18. In an example embodiment, the number of the control points may include the aggregate number of boundary control points and interior control points. The number of control points may be defined in each of two orthogonal dimensions, such as the number of control points in a length direction and a number of control points in a width direction.

As shown in block 22 of FIG. 2, the computing device 10, such as the processing circuitry 12, of an example embodiment may also define one or more boundary control points that comprise the boundary of the respective abnormality to be modeled. In this regard and relative to an embodiment in which the object is a vehicle, the representation of the abnormality will be modeled within the boundary, but will not extend beyond the boundary to adjacent portions of the surface of the vehicle. Although the boundary control points may be defined in various manners, the computing device, such as the processing circuitry, of an example embodiment defines the boundary, such as relative to a predefined origin, such as based upon input provided via the user interface 18. For example, the dimensions of the boundary with respect to the origin, such as in terms of the width and length of a boundary having a rectangular shape, may be defined, such as in terms of the number pixels. Along each side of the resulting boundary, the computing device, such as the processing circuitry, may then define one or more boundary control points, such as by defining the number of boundary control points that has been predefined in terms of the number of control points in the width direction and the number of control points in the length direction. In an example embodiment, the computing device, such as the processing circuitry, defines one boundary control point in each corner of a rectangularly-shaped boundary and then defines the other boundary control points along the boundary with the spacing between the boundary control points along the same side of the boundary being randomly selected.

The computing device 10, such as the processing circuitry 12, of an example embodiment may be configured to require the boundary control points that are randomly selected to be spaced from the corner of a rectangularly-shaped boundary by at least a predefined minimum spacing, such as described below in conjunction with the selection of interior control points. By way of example, in an instance in which a rectangularly-shaped boundary is centered about the origin (0,0) and extends both +40 pixels and −40 pixels in the width and length directions and in which the minimum spacing in both the width and length directions is 10 pixels, the computing device, such as the processing circuitry, may be configured to randomly select boundary control points within the range of −30 (−40+10) to +30 (+40−10) along the boundary in both the width and length directions, thereby insuring that the resulting boundary control points are spaced by at least 10 pixels from the corners of the rectangularly-shaped boundary. In this example, in an embodiment in which there are to be 5 boundary control points in each of the width and length directions, the boundary control points along one width-wise extending side may be (−40, +40), (−25, +40), (+20, +40), (+30, +40) and (+40, +40), while the boundary control points along the opposite width-wise extending side may be (−40, −40), (−25, −40), (+20, −40), (+30, −40) and (+40, −40). Similarly, the boundary control points along one length-wise extending side of this example embodiment may be (−40, +40), (−40, +25), (−40, +10), (−40, −20) and (−40, −40), while the boundary control points along the opposite width-wise extending side may be (+40, +40), (+40, +25), (+40, +10), (+40, −20) and (+40, −40). As this example illustrates, the boundary control points are selected in one example embodiment such that the opposed parallel sides of a rectangular boundary have boundary control points located in corresponding positions. The boundary control points may be differently positioned, however, in other embodiments.

The boundary control points define a surface in which all of the boundary control points lie. In one embodiment, the boundary control points may be defined to lie in a plane, such that the resulting surface is planar. Alternatively, the boundary control points may define a non-planar surface, such as a curved surface, such as in instances in which the surface of the object for which the abnormality is being generated is similarly non-planar. The boundary control points may be defined so as to define a boundary that is symmetrical relative to the origin in an instance in which the width and length are defined to have the same magnitude. However, boundary control points may be defined in other example embodiments such that the width and length differ in magnitude from one another with the resulting boundary being asymmetrical. Additionally, while boundary control points have been described in terms of width and length, the boundary control points and the resulting boundary may be defined in other manners, such as in terms of a radius for a circular boundary, lengths of the major and minor axes for an elliptical boundary or the like.

Another parameter that may be defined is the spacing. In this example embodiment, the computing device 10, such as the processing circuitry 12, is configured to define the minimum spacing from an interior control point and a respective boundary control point, that is, between the closest combination of an interior control point and a boundary control point. See block 24 of FIG. 2. In an example embodiment, the minimum spacing that is defined for a respective abnormality is the same relative to each boundary control point. Although a single minimum spacing may be defined relative to each boundary control point, the computing device, such as the processing circuitry, of an example embodiment is configured to define a plurality of predetermined minimum spacings, such as a vector of candidate minimum spacings, with the actual minimum spacing to be applied in reference to the parametric modeling of a respective abnormality being selected, e.g., randomly selected, as described below from the vector of candidate minimum spacings. Further, for a boundary that extends in at least two dimensions, such as in the x and y dimensions, the minimum spacing that is defined may be the same in each dimension or, alternatively, a different minimum spacing may be defined for each different dimension, such as a first minimum spacing in the x-dimension and a second minimum spacing, different than the first minimum spacing, in the y-dimension.

As shown in block 26 of FIG. 2 and relative to an embodiment in which the object is a vehicle, the computing device 10, such as the processing circuitry 12, of an example embodiment is also configured to define the maximum distance that an interior control point is able to deviate in an orthogonal direction from the surface defined by the boundary control points. As the surface in which the boundary control points are defined represents the surface of the vehicle, such as the surface of the vehicle in the absence of the abnormality, the maximum distance that an interior control point is able to deviate in an orthogonal direction from the surface defined by the boundary control points similarly corresponds to the maximum distance that an interior control point is able to deviate from the surface of the vehicle. Although the maximum distance that is defined may be applied both in a positive z-direction extending outward in an orthogonal direction from the surface defined by the boundary control points in which the maximum distance corresponds to the maximum height that an abnormality may protrude from the surface of the vehicle and in a negative z-direction extending inward in an orthogonal direction relative to the surface defined by the boundary control points in which the maximum distance corresponds to the maximum depth of an abnormality relative to the surface of the vehicle, the computing device, such as the processing circuitry, of an example embodiment may be configured to define different maximum distances that an interior control point is able to deviate in an orthogonal direction from the surface defined by the boundary control points in the positive z-direction and in the negative z-direction. Although a single value for the maximum distance may be defined for both the positive z-direction and the negative z-direction, the computing device, such as the processing circuitry, of an example embodiment is configured to define a plurality of different candidate values for the maximum distance with the maximum distance to be applied in reference to the parametric modeling of an abnormality being selected as described below from the plurality of different candidate values for the maximum distance that have been predefined. In alternative embodiments, different sets of predetermined values for the maximum distance may be defined for the positive z-direction and the negative z-direction.

Although several examples of parameters that are associated with a respective abnormality are described above in conjunction with FIG. 2, not all of the parameters that have been discussed need be defined for each respective abnormality and, in some embodiments, one or more different types of parameters may be defined, either in addition to or instead of the parameters described above. By way of example, a parameter may also be defined that controls the smoothness of the surface representative of the respective abnormality that will be generated. In this regard, there may be a tradeoff between increased smoothness of the surface and the computing resources and time that are required to generate a smoother surface as well as the size of the resulting file that is required to represent a smoother surface.

Figure 3:
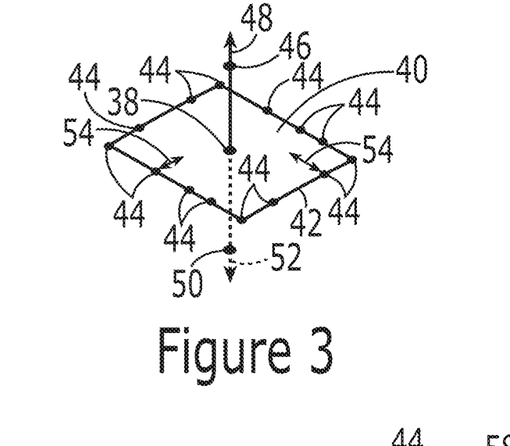
FIG. 3 is a graphical representation of a plurality of parameters, such as limits, associated with a respective abnormality.

Based upon the parameters associated with respective abnormality that have been defined, the computing device 10, such as the processing circuitry 12, is configured to select, such as by randomly selecting, one or more control points, such as interior control points, that satisfy the parameters that have been selected, such as depicted in block 28 of FIG. 2. By way of example, FIG. 3 graphically illustrates parameters that have been defined in association with an abnormality in the surface that is to be generated. These parameters include boundary control points 44 that are defined relative to an origin 38 and that serve to define the boundary 42 of the abnormality and the maximum distance that an interior control point is able to deviate in an orthogonal direction from the surface of the vehicle. In this regard, both a maximum distance 46 in the positive z-direction 48 and the maximum distance 50 in the negative z-direction 52 are depicted. FIG. 3 also depicts the spacing 54, that is, the minimum spacing allowed from an interior control point that is selected to a respective boundary control point. The number of control points that are selected may be defined by a corresponding parameter, such as the number of control points in the width direction and the number of control points in the length direction as described above.

Figure 4:
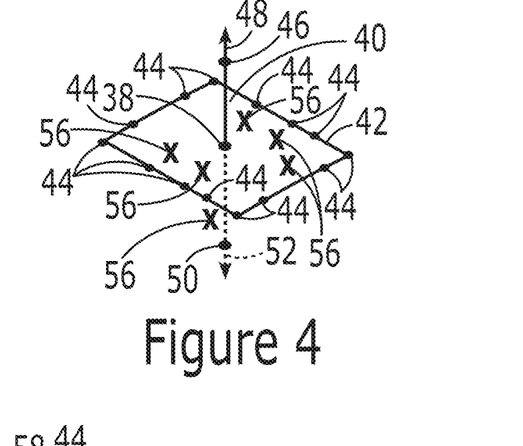
FIG. 4 is a graphical representation of a plurality of control points that have been selected in accordance with an example embodiment of the present disclosure.

In satisfaction of the parameters that have been defined, such as the parameters depicted by way of example in FIG. 3, the computing device 10, such as the processing circuitry 12, is configured to select a plurality of control points, such as a plurality of interior control points. As shown in FIG. 4, each of the interior control points 56 is designated by an X, is within the boundary 42 defined by the boundary control points 44 and is spaced from the nearest respective boundary control point by at least the defined minimum spacing. Additionally, the interior control points that are selected are within, that is, less than, the maximum distance 46, 50 in an orthogonal direction 48, 52 from the surface 40 defined by the boundary control points.

In an example embodiment, the computing device 10, such as the processing circuitry 12, is configured to randomly select a plurality of interior control points that satisfy the parameters associated with the respective abnormality so as to define an array of control points. In an example embodiment, a vector of candidate values for the minimum spacing between an interior control point and a boundary control point has been defined and/or set(s) of candidate values for the maximum distance in the positive z-direction and/or negative z-direction have been defined. Although the computing device, such as the processing circuitry, may be configured to randomly select the interior control point(s) in various manners, the computing device, such as the processing circuitry, of this example embodiment is configured to first select a respective value of one or more parameters for which a plurality of candidate values have been predefined and to thereafter select interior control point(s) so as to satisfy the selected value(s) of the parameter(s). By way of example, but not of limitation, the vector of candidate values for the minimum spacing from an interior control point to a boundary control point may be defined as [5, 10, 15, 20], the set of candidate values for the maximum distance in the negative z-direction that an interior control point is able to deviate from the surface 40 defined by the boundary control points may be defined as [−100, −90, −80, −70, −60, −50, −40, −30] and the set of values for the maximum distance in the positive z-direction that an interior control point is able to deviate from the surface defined by the boundary control points may be defined as [30, 40, 50, 60, 70, 80, 90, 100]. Although sets of candidate values that are evenly spaced and that have integer values are provided by way of example, the candidate values need not be integer values and the spacing between candidate values may be unequal and follow any desired gradient. As such, the computing device, such as the processing circuitry, of this example embodiment is configured to first select a value for the minimum spacing from the vector of candidate minimum spacing values and values for the maximum distance in the positive z-direction and negative z-direction from the respective sets of candidate maximum distance values. The computing device, such as the processing circuitry, is then configured to select, such as by randomly selecting, interior control point(s) that satisfy the selected values for this minimum spacing and the maximum distance as well as the other parameters that have been defined, such as the parameters that have been defined with respect to the number of the control points and the coordinates of the boundary control points.

In one example embodiment in which the boundary is defined in the x-y plane, the interior control points are randomly selected to have a z-coordinate that satisfy the maximum distance in the positive z-direction and negative z-direction. However, the interior control points of this example embodiment are defined such that their x- and y-coordinates correspond to the x- and y-coordinates of the boundary control points. For example, in an embodiment in which the boundary includes width-wise extending sides that extend in the x-direction and length-wise extending sides that extend in the y-direction, an interior control point may have an x-coordinate equal to an x-coordinate of a boundary control point along a width-wise extending side of the boundary and a y-coordinate equal to a y-coordinate of a boundary control point along a length-wise extending side of the boundary. By way of illustration, but not of limitation, in an embodiment in which the boundary control points along one width-wise extending side are (−40, +40), (−25, +40), (+20, +40), (+30, +40) and (+40, +40) and the boundary control points along one length-wise extending side are (−40, +40), (−40, +25), (−40, +10), (−40, −20) and (−40, −40), interior control points may be defined as follows in a first row as (−25, +25), (+20, +25) and (+30, +25), in a second row as (−25, +10), (+20, +10) and (+30, +10) and in a third row as (−25, −20), (+20, −20) and (+30, −20). As such, the boundary control points and the interior control points of this example embodiment may be aligned with the z-coordinate of the interior control points being randomly selected in a manner that satisfies the maximum distance in the positive z-direction and negative z-direction. In other embodiments, however, the boundary control points and the interior control points may be selected so as not to be aligned.

Figure 5:
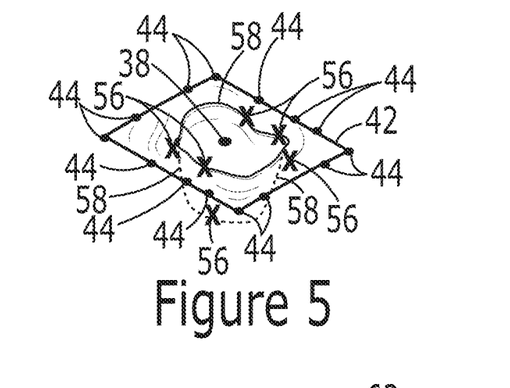
FIG. 5 is a graphical representation of a surface of a respective abnormality that has been generated based on the plurality of control points that have been selected in accordance with an example embodiment of the present disclosure.

As noted in block 30 of FIG. 2, the computing device 10, such as the processing circuitry 12, is configured to generate a surface representative of the respective abnormality based on the one or more control points, such as the boundary control points and the interior control points. The computing device, such as the processing circuitry, may be configured to generate the surface in various manners, but, in one embodiment, this configured to generate a b-spline surface based on the control points, such as generating a surface that extends through the control points or that makes the best positional approximation to the control points. An example of the surface 58 of a respective abnormality, such as a dent, that is generated from the control points 44, 56 that are selected as shown in FIG. 4 is depicted in FIG. 5. For example, the computing device, such as the processing circuitry, may be configured to generate the b-spline surface utilizing an object-oriented Basis (B)-spline and Non-Uniform Rational Basis Spline (NURBS) evaluation library, such as geomdl 5.3.1 as provided by the Python Software Foundation. See https://pypi.org/project/geomdl. In an example embodiment, the computing device, such as the processing circuitry, is configured to store a representation of the surface that has been generated, such as a representation of the surface geometry, in a file having a format, such as an .obj or .fbx file format, that facilitates the subsequent rendering of a synthetic image. The file storing the representation of the surface, such as a file in an .obj file format, that was generated by an object-oriented B-spline and NURBS evaluation library may also include one or more keywords, such as vertex_spacing defining the size of a triangle edge in terms of surface points that were sampled, vertex_normals that indicates whether or not vertex normals are to be computed, parametric_vertices which indicates whether or not parameter space vertices are to be added and/or update_delta which indicates whether or not a multi-surface evaluation delta is to be used for all surfaces.

In order to generate the surface representative of the respective abnormality, the computing device 10, such as the processing circuitry 12, of an example embodiment may be configured define the smoothness of the resulting surface based upon, for example, a surface delta. In one embodiment, a different surface delta is defined for each dimension of the resulting surface, such as one surface delta in the x-direction and another surface delta in the y-direction. For purposes of this example, however, a single surface delta is defined for each dimension of the resulting surface. The surface delta defines the step size that, in turn, defines the spacing of the surface points that are generated to form the resulting surface. Thus, a smaller surface delta results in a smaller step size and a correspondingly larger number of surface points which results in a smoother surface, while a larger surface delta results in a larger step size and a correspondingly smaller number of surface points which results in a less smooth surface.

In relation to the generation of the surface, the computing device 10, such as the processing circuitry 12, of this example embodiment may generate surface knot vectors based upon the control points, including the boundary control points and the interior control points. In one embodiment, the control points form a grid, such as a three dimensional array of coordinates. However, the control points can be disposed in other layouts and have other shapes in other embodiments. Regardless, the computing device, such as the processing circuitry of this example embodiment is configured to evaluate the surface knot vectors, such as by iterating on the knot vectors, to generate the surface points that define the resulting surface. The step size defined by the surface delta defines the number of surface points that are generated with the step size having an inverse relationship to the number of surface points, e.g., a smaller surface delta correlates to a smaller step size and a larger number of surface points. The larger the number of surface points, the smoother is the resulting surface, while the fewer the number of surface points, the less smooth is the resulting surface.

To generate a plurality of surfaces representative of an abnormality, this process may be repeated. In this regard, by repeatedly selecting one or more control points that satisfy the parameters associated with a respective abnormality, the computing device 10, such as the processing circuitry 12, may generate a plurality of different surfaces representative of the respective abnormality.

Figure 6:
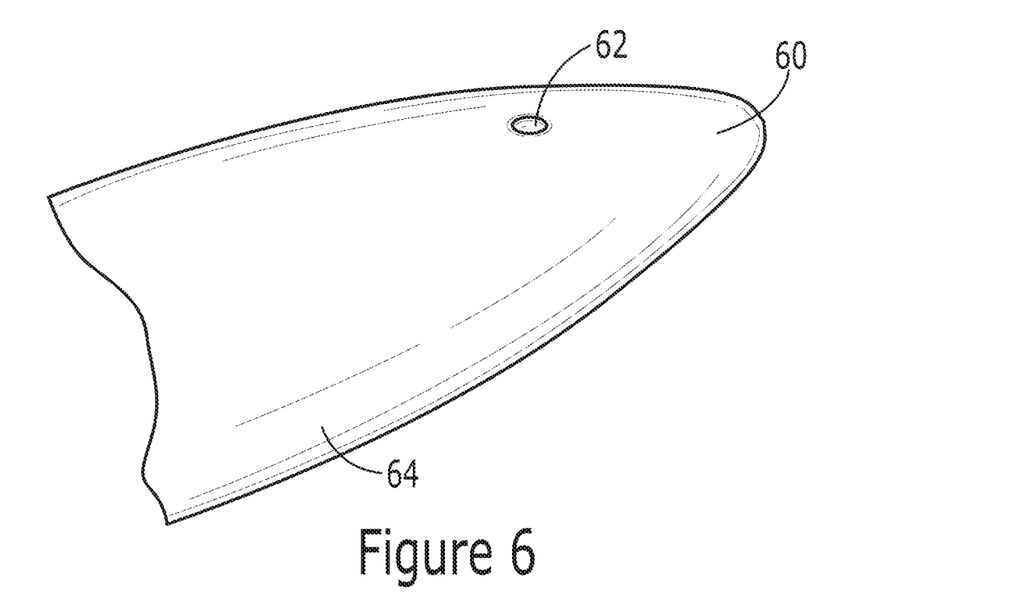
FIG. 6 is an example of a synthetic image of a portion of the surface of an aircraft having a respective abnormality as defined by the parametric modeling thereof in accordance with the example embodiment of the present disclosure.

As shown is block 32 of FIG. 2, the computing device 10, such as the processing circuitry 12, is also configured to render a synthetic image of at least a portion of the surface of the object, such as the vehicle, having the respective abnormality as defined by the parametric modeling thereof. In this regard, the synthetic image that is rendered may include the surface representative of the respective abnormality that has been generated or at least an approximation of the surface representative of the respective abnormality that has been generated. In an embodiment in the surface 40 defined by the boundary control points 44 has a different shape than the surface of the object for which the abnormality is being synthetically generated, the computing device, such as the processing circuitry, is configured to transform the surface defined by the boundary control points to correspond to the surface of the object for which the abnormality is being synthetically generated, such that the surfaces have the same shape. Alternatively, the surface defined by the boundary control points may be initially defined to have the same shape as the surface of the object for which the abnormality is being synthetically generated, as noted above. One example of a synthetic image that is rendered of a portion of the surface 64 of a vehicle, such as an aircraft 60, having the respective abnormality 62, such as a dent, is depicted in FIG. 6.

Figure 7:
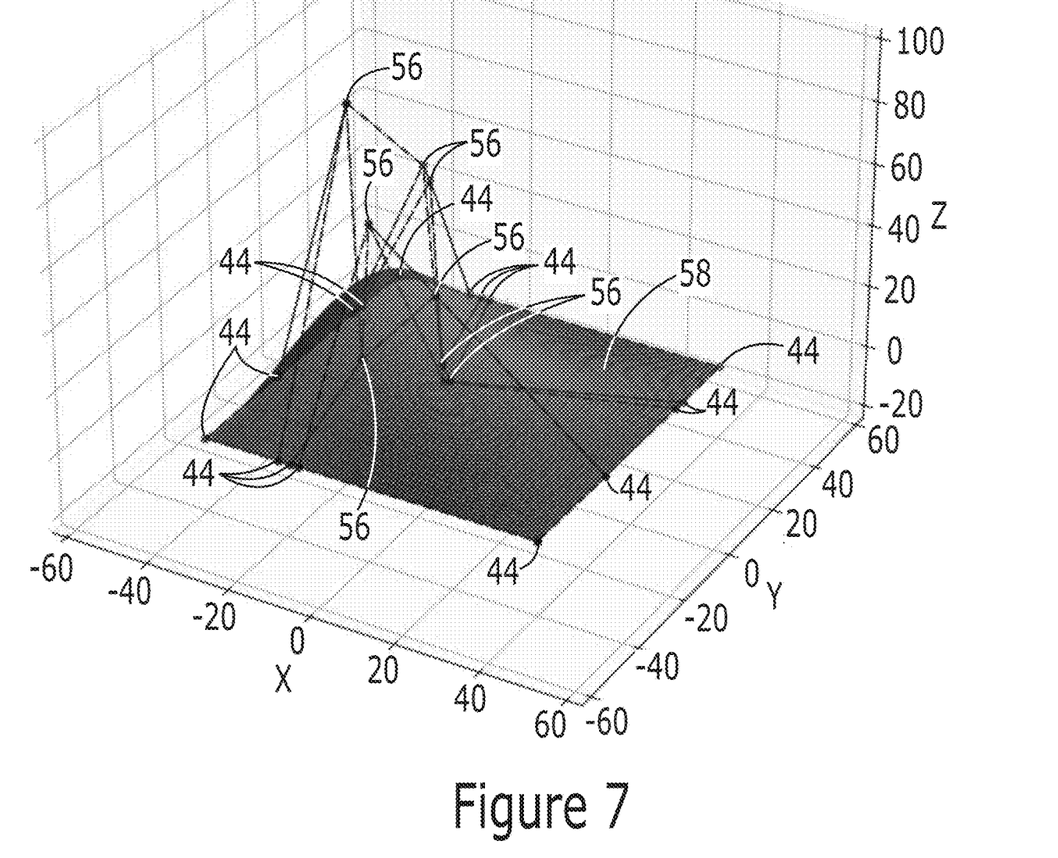
FIG. 7 is a perspective view of a plurality of control points and the resulting surface that is generated in accordance with an example embodiment of the present disclosure.
Figure 8:
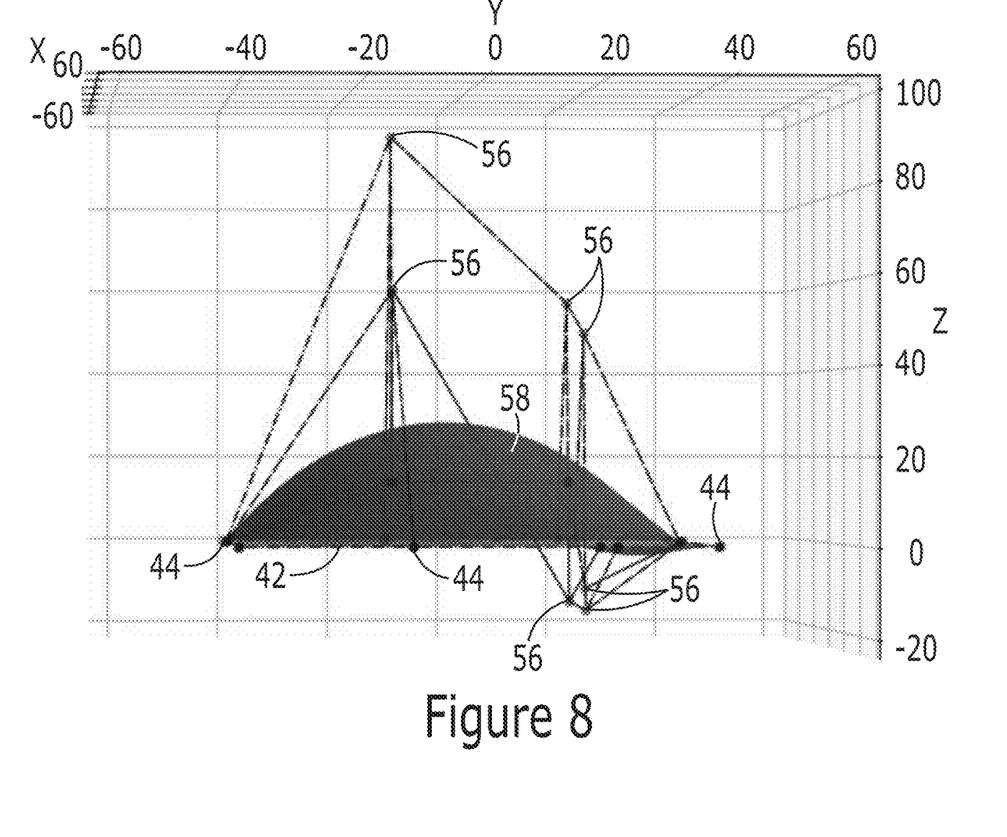
FIG. 8 is a side view of the plurality of control points and the resulting surface that is generated in accordance with the example embodiment depicted in FIG. 7.

Another example of a surface 58 that is generated in accordance with an example embodiment based on a plurality of randomly selected control points is depicted in FIGS. 7 and 8. As shown in a perspective view in FIG. 7 and in a side view in FIG. 8, the boundary 42 is defined to extend between −55 and +25 in the width (or x) direction and between −15 and −65 in the length (or y) direction, the number of control points is defined to be 5 in the width (or x) direction and 5 in the length (or y) direction and the interior control points 56 are limited in the z-direction to a maximum of +100 in the positive z-direction and to −20 in the negative z-direction. Further, the minimum spacing between an interior control point and a boundary control point 44 is 15. In an instance in which the surface of the object for which the abnormality is being generated is non-planar, the resulting surface that is generated may be transformed to correspond to surface of the object with the boundary of the surface generated for the abnormality being having the same non-planar shape following transformation.

The computing device 10, such as the processing circuitry 12, is configured to render the synthetic image in accordance with a predefined lighting condition and from a predefined viewpoint. In an example embodiment, the computing device, such as the processing circuitry, is configured to render a plurality of synthetic images of at least the same portion of the surface of the vehicle having the same respective abnormality in accordance with the plurality of a different lighting conditions and from a plurality of different viewpoints. As such, the parametric modeling of a respective abnormality that results in the generation of a surface of a respective abnormality based on one or more control points may correspondingly result in a plurality of synthetic images.

The number of synthetic images that are generated may be further increased in some embodiments by repeating the process described above in conjunction with blocks 28, 30 and 32 of FIG. 2 with the selection, such as the random selection, of different sets of control points that satisfy the parameters associated with the respective abnormality and the generation of corresponding surfaces of the respective abnormality based upon the selected control points. A synthetic image (or a plurality of synthetic images under different lighting conditions and/or from different viewpoints) may then be rendered based upon each surface representative of the respective abnormality that have been generated from the one or more control points that have been selected. The number of synthetic images that are generated may be determined in various manners, such as by generating a predetermined number of synthetic images or by generating a number of synthetic images that is defined based upon user input, such as provided via the user interface 18.

Figure 9:
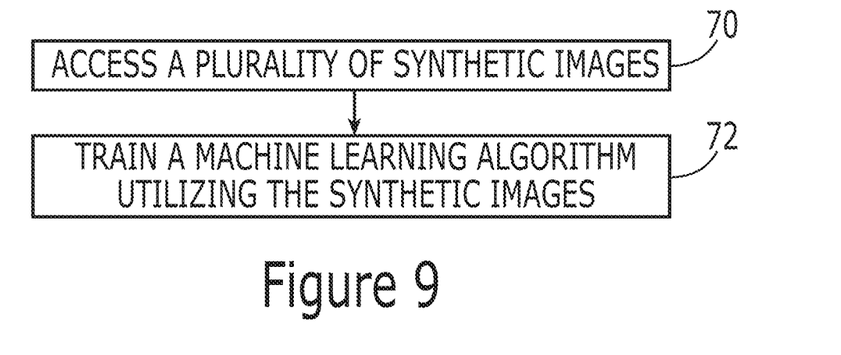
FIG. 9 is a flow chart illustrating the operations performed in order to train a machine learning algorithm to inspect at least a portion of a surface of an object in accordance with an example embodiment of the present disclosure.

As shown in FIG. 9, the computing device 10, such as the processing circuitry 12, of an example embodiment is also configured to train a machine learning algorithm utilizing the synthetic images that have been generated. The computing device that is configured to train the machine learning algorithm may be the same computing device that has generated the synthetic images or a different computing device. If a different computing device, the computing device that configured to train the learning algorithm may also be configured in accordance with an example embodiment as shown, for example, in FIG. 1. As shown in block 70 of FIG. 9, the computing device, such as the processing circuitry, may be configured to access a plurality of synthetic images that have been rendered of at least a portion of the surface of the object, such as a vehicle, having the respective abnormality. In this regard, the plurality of synthetic images may be the synthetic images that are generated as described above in conjunction with FIG. 2. The computing device, such as the processing circuitry, may be configured to access the synthetic images from memory 14 or from an external or remote memory device or database, such as via the communication interface 16.

The computing device 10, such as the processing circuitry 12, of this example embodiment is then configured to train the machine learning algorithm utilizing the plurality of synthetic images by sequentially providing the synthetic images to the machine learning algorithm which, in turn, attempts to detect and/or classify the abnormality illustrated by a respective synthetic image. See block 72 of FIG. 9. The computing device, such as the processing circuitry, may also be configured to train the machine learning algorithm by providing feedback to the machine learning algorithm based upon the detection and/or the classification of the abnormality by the machine learning algorithm relative to the actual identity and/or classification of the abnormality that is represented by the synthetic image (as may be defined by data or metadata associated with the synthetic image). By training the machine learning algorithm utilizing a substantial number of synthetic images that may readily be generated in accordance with an example embodiment of the present disclosure, the machine learning algorithm may be more quickly trained to detect and/or classify abnormalities in an accurate and efficient manner, thereby facilitating subsequent inspection of the surface of a vehicle, such as an aircraft, to detect abnormalities, e.g., dents, scratches, corrosion, etc., and to allow appropriate corrective action to be scheduled and completed.

As described above, FIGS. 2 and 9 are flowcharts of a computing device 10, method, and computer program product configured to generate synthetic images of abnormalities on a surface of an object, such as a vehicle, for use in training a machine learning algorithm according to an example embodiment. It will be understood that each block of the flowcharts, and combinations of blocks in the flowcharts, may be implemented by various means, such as hardware, firmware, processing circuitry 12, and/or other devices associated with execution of software including one or more computer program instructions. For example, one or more of the procedures described above may be embodied by computer program instructions. In this regard, the computer program instructions which embody the procedures described above may be stored by the memory device 14 of the computing device and executed by the processing circuitry or the like. As will be appreciated, any such computer program instructions may be loaded onto a computer or other programmable device (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for generating synthetic images of abnormalities on a surface of an object for use in training a machine learning algorithm, the method comprising:
for each of a plurality of abnormalities, parametrically modeling a respective abnormality by selecting one or more control points that satisfy parameters associated with the respective abnormality and generating a surface representative of the respective abnormality based on the one or more control points; and
rendering a plurality of synthetic images of at least a portion of the surface of the object having the respective abnormality as defined by the parametric modeling thereof, wherein rendering the plurality of synthetic images comprises rendering the plurality of synthetic images in accordance with a plurality of different lighting conditions and from a plurality of different viewpoints.

2. A method according to claim 1, wherein selecting one or more control points comprises randomly selecting a plurality of control points that satisfy the parameters associated with the respective abnormality so as to define an array of control points.

3. A method according to claim 1, further comprising defining a number of the control points, wherein the parameters associated with the respective abnormality comprise the number of the control points.

4. A method according to claim 1, further comprising defining one or more boundary control points along a boundary of the respective abnormality, wherein the parameters associated with the respective abnormality define the boundary.

5. A method according to claim 4, wherein the one or more control points comprise one or more interior control points, and wherein the method further comprises defining a minimum spacing from the one or more interior control points that are selected to a respective boundary control point, wherein the parameters associated with the respective abnormality comprise the minimum spacing.

6. A method according to claim 1, further comprising defining a maximum distance that a control point is able to deviate in an orthogonal direction from the surface of the object, wherein the parameters associated with the respective abnormality comprise the maximum distance.

7. A method according to claim 1, wherein generating the surface representative of the respective abnormality comprises generating a b-spline surface.

8. A computing device configured to generate synthetic images of abnormalities on a surface of an object for use in training a machine learning algorithm, the computing device comprising processing circuitry and at least one non-transitory memory including computer program code instructions stored therein, the computer program code instructions configured to, when executed by the processing circuitry, cause the computing device at least to:
for each of a plurality of abnormalities, parametrically model a respective abnormality by selecting one or more control points that satisfy parameters associated with the respective abnormality and generating a surface representative of the respective abnormality based on the one or more control points; and
render a plurality of synthetic images of at least a portion of the surface of the object having the respective abnormality as defined by the parametric modeling thereof, wherein the computer program code instructions are configured to cause the computing device to render the plurality of synthetic images by rendering the plurality of synthetic images in accordance with a plurality of different lighting conditions and from a plurality of different viewpoints.

9. A computing device according to claim 8, wherein the computer program code instructions are configured to cause the computing device to select one or more control points by randomly selecting a plurality of control points that satisfy the parameters associated with the respective abnormality so as to define an array of control points.

10. A computing device according to claim 8, wherein the computer program code instructions are further configured to cause the computing device to define a number of the control points, and wherein the parameters associated with the respective abnormality comprise the number of the control points.

11. A computing device according to claim 8, wherein the computer program code instructions are further configured to cause the computing device to define one or more boundary control points along a boundary of the respective abnormality, and wherein the parameters associated with the respective abnormality define the boundary.

12. A computing device according to claim 11, wherein the one or more control points comprise one or more interior control points, and wherein the computer program code instructions are further configured to cause the computing device to define a minimum spacing from the one or more interior control points that are selected to a respective boundary control point, and wherein the parameters associated with the respective abnormality comprise the minimum spacing.

13. A computing device according to claim 8, wherein the computer program code instructions are further configured to cause the computing device to define a maximum distance that a control point is able to deviate in an orthogonal direction from the surface of the object, and wherein the parameters associated with the respective abnormality comprise the maximum distance.

14. A computing device according to claim 8, wherein the computer program code instructions are configured to cause the computing device to generate the surface representative of the respective abnormality by generating a b-spline surface.

15. A computer program product configured to generate synthetic images of abnormalities on a surface of an object for use in training a machine learning algorithm, the computer program product comprising at least one non-transitory computer-readable storage medium having computer-executable program code instructions stored therein, the computer-executable program code instructions comprising program code instructions configured to:
for each of a plurality of abnormalities, parametrically model a respective abnormality by defining one or more boundary control points along a boundary of the respective abnormality with the boundary being defined by parameters associated with the respective abnormality, selecting one or more control points that satisfy the parameters associated with the respective abnormality and generating a surface representative of the respective abnormality based on the one or more control points; and
render a synthetic image of at least a portion of the surface of the object having the respective abnormality as defined by the parametric modeling thereof, wherein the program code instructions configured to render the synthetic image comprise program code instructions configured to render the synthetic image in accordance with a predefined lighting condition and from a predefined viewpoint so as to be within the boundary without extending beyond the boundary.

16. A computer program product according to claim 15, wherein the computer-executable program code instructions further comprise program code instructions configured to define a number of the control points, and wherein the parameters associated with the respective abnormality comprise the number of the control points.

17. A computer program product according to claim 15, wherein the computer-executable program code instructions further comprise program code instructions configured to define a maximum distance that a control point is able to deviate in an orthogonal direction from the surface of the object, and wherein the parameters associated with the respective abnormality comprise the maximum distance.

18. A computer program product according to claim 15, wherein the one or more control points comprise one or more interior control points, and wherein the computer-executable program code instructions further comprise program code instructions configured to define a minimum spacing from the one or more interior control points that are selected to a respective boundary control point, wherein the parameters associated with the respective abnormality comprise the minimum spacing.

19. A computer program product according to claim 15, wherein the program code instructions configured to select one or more control points comprise program code instructions configured to randomly select a plurality of control points that satisfy the parameters associated with the respective abnormality so as to define an array of control points.

20. A computer program product according to claim 15, wherein the program code instructions configured to render the synthetic image comprise program code instructions configured to render a plurality of synthetic images of at least the portion of the surface of the object having the same respective abnormality in accordance with a plurality of different lighting conditions and from a plurality of different viewpoints.

* * * * *